US012692057B2

(12) United States Patent
Konishi et al.

(10) Patent No.:     US 12,692,057 B2
(45) Date of Patent:          Jul. 28, 2026

(54) BARRIER FILM AND PACKAGING MATERIAL

(71) Applicant: DAI NIPPON PRINTING CO., LTD., Tokyo (JP)

(72) Inventors: Kenta Konishi, Tokyo (JP); Tsuyoshi Suzuki, Tokyo (JP); Yosuke Taguchi, Tokyo (JP); Yoshiyuki Ono, Tokyo (JP); Hiroyuki Otaki, Tokyo (JP); Ryutaro Harada, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 299 days.

(21) Appl. No.: 17/642,534

(22) PCT Filed: Sep. 4, 2020

(86) PCT No.: PCT/JP2020/033678
§ 371 (c)(1),
(2) Date: Mar. 11, 2022

(87) PCT Pub. No.: WO2021/049439
PCT Pub. Date: Mar. 18, 2021

(65) Prior Publication Data
US 2023/0002131 A1      Jan. 5, 2023

(30) Foreign Application Priority Data

Sep. 11, 2019     (JP) .................................. 2019-165601

(51) Int. Cl.
*B65D 65/40*          (2006.01)
*B32B 7/12*           (2006.01)
(Continued)

(52) U.S. Cl.
CPC ................ *B65D 65/40* (2013.01); *B32B 7/12* (2013.01); *B32B 27/08* (2013.01); *B32B 27/16* (2013.01);
(Continued)

(58) Field of Classification Search
None
See application file for complete search history.

(56) References Cited

U.S. PATENT DOCUMENTS

2017/0009034 A1*   1/2017   Suzuki .................. C23C 16/403
2018/0311938 A1*   11/2018   Murase .................. B65D 65/40
(Continued)

FOREIGN PATENT DOCUMENTS

EP          1563989 A  *   8/2005
EP          3130459        2/2017
(Continued)

OTHER PUBLICATIONS

International Preliminary Report on Patentability, issued in the corresponding PCT application No. PCT/JP2020/033678, dated Mar. 15, 2022, 6 pages.
(Continued)

*Primary Examiner* — Vivian Chen
(74) *Attorney, Agent, or Firm* — HSML P.C.

(57)          ABSTRACT

An object of the present invention is to provide a barrier film whose gas barrier properties hardly deteriorate even after a retort treatment and after a Gelboflex test. The barrier film of the present invention includes a barrier coat layer, an inorganic oxide deposition layer, and a substrate layer, in this order, wherein the barrier coat layer has a hardness of 1.10 GPa or more and 1.55 GPa or less, and a plastic deformation rate of 21.0% or more.

10 Claims, 1 Drawing Sheet

(51) Int. Cl.

| | |
|---|---|
| *B32B 27/08* | (2006.01) |
| *B32B 27/16* | (2006.01) |
| *B32B 27/32* | (2006.01) |
| *B32B 27/36* | (2006.01) |
| *C08J 7/04* | (2020.01) |
| *C08J 7/048* | (2020.01) |
| *C09D 123/08* | (2006.01) |
| *C09D 129/04* | (2006.01) |
| *C09D 201/10* | (2006.01) |

(52) U.S. Cl.
CPC .............. *B32B 27/32* (2013.01); *B32B 27/36* (2013.01); *C09D 129/04* (2013.01); *B32B 2250/03* (2013.01); *B32B 2250/24* (2013.01); *B32B 2255/10* (2013.01); *B32B 2255/20* (2013.01); *B32B 2255/26* (2013.01); *B32B 2255/28* (2013.01); *B32B 2307/31* (2013.01); *B32B 2307/518* (2013.01); *B32B 2307/536* (2013.01); *B32B 2307/7244* (2013.01); *B32B 2553/00* (2013.01); *C08J 7/0423* (2020.01); *C08J 7/048* (2020.01); *C08J 2367/02* (2013.01); *C08J 2400/14* (2013.01); *C08J 2429/04* (2013.01); *C09D 123/0861* (2013.01); *C09D 201/10* (2013.01)

(56) References Cited

U.S. PATENT DOCUMENTS

2023/0258980 A1 * 8/2023 Fukugami ................ C08J 7/043
428/216

2025/0153912 A1 * 5/2025 Yamada .................. B32B 27/32

FOREIGN PATENT DOCUMENTS

| | | | | |
|---|---|---|---|---|
| EP | 3305682 | A | * | 11/2018 |
| JP | 2007-168085 | | | 7/2007 |
| JP | 2007-168085 | A | * | 7/2007 |
| JP | 2007-290292 | | | 11/2007 |
| JP | 2007-290292 | A | * | 11/2007 |
| JP | 2009-006582 | | | 1/2009 |
| JP | 2009-006582 | A | * | 1/2009 |
| JP | 2010-221596 | | | 10/2010 |
| JP | 2010-221596 | A | * | 10/2010 |
| JP | 2013-202822 | | | 10/2013 |
| JP | 2013-202822 | A | * | 10/2013 |
| JP | 2015-193193 | | | 11/2015 |
| WO | 2004-048081 | | | 6/2004 |
| WO | WO 2014/125877 | A1 | * | 8/2014 |
| WO | WO 2015/152069 | A | * | 8/2015 |
| WO | 2019/044525 | | | 3/2019 |
| WO | WO 2020/129291 | A | * | 6/2020 |
| WO | WO 2022/097700 | A1 | * | 5/2022 |

OTHER PUBLICATIONS

Extended European Search Report, issued in the corresponding European patent application No. 20863485.7, dated Sep. 8, 2023, 12 pages.

International Search Report, issued in the corresponding PCT application No. PCT/JP2020/033678, dated Oct. 27, 2020, 6 pages.

Japanese Office Action, issued in the corresponding Japanese patent application No. 2019-165601, dated Mar. 5, 2021, 7 pages.

* cited by examiner

BARRIER FILM AND PACKAGING MATERIAL

BACKGROUND OF THE INVENTION

Field of the Invention

The preset invention relates to a barrier film. More particularly, the present invention relates to a barrier film comprising a barrier coat layer, an inorganic oxide deposition layer, and a substrate layer, in this order. In addition, the present invention relates to a packaging material comprising the barrier film.

Background Art

In the field that requires a moist heat sterilization treatment (hereinafter referred to as "retort treatment") of foods, medicines, etc., in order to suppress the alteration of contents and maintain their functions and properties, it has been conventionally necessary to prevent an effect caused by oxygen, water vapor and another gas which can alter the contents. These gases can permeate a packaging material. The packaging material in this field has been required to have gas barrier properties to block these gases. A film of a vinylidene chloride resin, which is excellent in gas barrier property among polymers, or a film coated with these resins have been used. However, their gas barrier properties are greatly affected by temperature and humidity, and there has been a technical problem that they cannot meet the demand for high gas barrier properties.

In recent years, the field that requires the retort treatment of foods, medicines, etc. needs a barrier film capable of stably exhibiting higher barrier properties unaffected by temperature, humidity, etc., in order to prevent alteration of contents and maintain their functions and properties. Thus, a barrier film formed by laminating a vapor deposition layer of silicon oxide, aluminum oxide, etc., and a membrane layer having barrier properties has been developed.

For example, Patent Document 1 proposes a gas barrier lamination film comprising: a gas barrier deposition layer provided on the resin substrate and a gas barrier coating layer provided on the gas barrier deposition layer. The gas barrier deposition layer mainly contains an inorganic compound. The bas barrier coating layer is obtained by applying, to the gas barrier deposition layer, an application liquid and by drying the application liquid. The application liquid contains a specific silicon compound, its hydrolysis product, and a water soluble polymer having a hydroxyl group.

Patent Document 1: WO2004-048081

SUMMARY OF THE INVENTION

The inventors noticed that although a packaging material using the gas barrier lamination film proposed by Patent Document 1 has excellent gas barrier properties after a retort treatment, the gas barrier properties deteriorate after a Gelboflex test. As a result of conducted extensive studies, the inventors found that, when a gas barrier coating layer (barrier coat layer) has a plastic deformation rate and a hardness, which are in specific numerical ranges, the bas barrier coating layer can surely have high gas barrier properties after a retort treatment and after a Gelboflex test.

The present invention has been made in view of the above findings. An object of the present invention is to provide a barrier film whose gas barrier properties hardly deteriorate even after a retort treatment and after a Gelboflex test. Another object thereof is to provide a packaging material using such a barrier film.

The present invention is a barrier film comprising a barrier coat layer, an inorganic oxide deposition layer, and a substrate layer, in this order, wherein the barrier coat layer has a hardness of 1.10 GPa or more and 1.55 GPa or less, and a plastic deformation rate of 21.0% or more.

In one embodiment, the inorganic oxide deposition layer is preferably an aluminum deposition layer or a silicon oxide deposition layer.

In one embodiment, the barrier coat layer is preferably a cured resin layer of a metal alkoxide and a water-soluble polymer.

In one embodiment, the barrier film has an oxygen transmission rate of preferably 1.0 $cc/m^2 \cdot atm \cdot day$ or less, the oxygen transmission rate being measured in accordance with the JIS K7126 method under an environment with a temperature of 23° C. and a humidity of 90% RH.

The present invention is a packaging material comprising the aforementioned barrier film.

In one embodiment, the packaging material preferably comprises a heat sealing layer, a barrier layer made of the barrier film, and an outer layer, in this order.

In one embodiment, the heat sealing layer preferably contains a polyolefin resin.

In one embodiment, the outer layer preferably contains a polyester resin.

The present invention can provide a barrier film whose gas barrier properties hardly deteriorate even after a retort treatment and after a Gelboflex test. In addition, the present invention can provide a packaging material using such a barrier film.

DETAILED DESCRIPTION OF THE INVENTION

<Barrier Film>

A barrier film according to the present invention comprises a barrier coat layer, an inorganic oxide deposition layer, and a substrate layer, in this order. A packaging material using the barrier film of the present invention having such a layer structure can have gas barrier properties which hardly deteriorate even after a retort treatment. Since the packaging material has an improved bending resistance, the gas barrier properties hardly deteriorate even after a Gelboflex test. Such a barrier film can be suitably used as a barrier layer for a packaging material required to have gas barrier properties even after a retort treatment and after a Gelboflex test.

An oxygen transmission rate of the barrier film is preferably 1.0 $cc/m^2 \cdot atm \cdot day$ or less, more preferably 0.8 $cc/m^2 \cdot atm \cdot day$ or less, further preferably 0.6 $cc/m^2 \cdot atm \cdot day$ or less, and furthermore preferably 0.5 $cc/m^2 \cdot atm \cdot day$ or less. The oxygen transmission rate is measured in accordance with the JIS K7126 method under an environment with a temperature of 23° C. and a humidity of 90% RH. A barrier film whose oxygen transmission rate satisfies the above numerical range can have suitable oxygen barrier properties. Thus, the barrier film used as a barrier layer of a packaging material can suppress an adverse effect on contents of the packaging material.

A water vapor transmission rate of the barrier film is preferably 1.0 g/m²·day or less, more preferably 0.9 g/m²·day or less, further preferably 0.8 g/m²·day or less, and furthermore preferably 0.7 g/m²·day or less. The water vapor transmission rate is measured in accordance with the JIS K7129 method under an environment with a temperature of 40° C. and a humidity of 100% RH. A barrier film whose water vapor transmission rate satisfies the above numerical range can have suitable water vapor barrier properties. Thus, the barrier film used as a barrier layer of a packaging material can suppress an adverse effect on contents of the packaging material.

Figure 1:
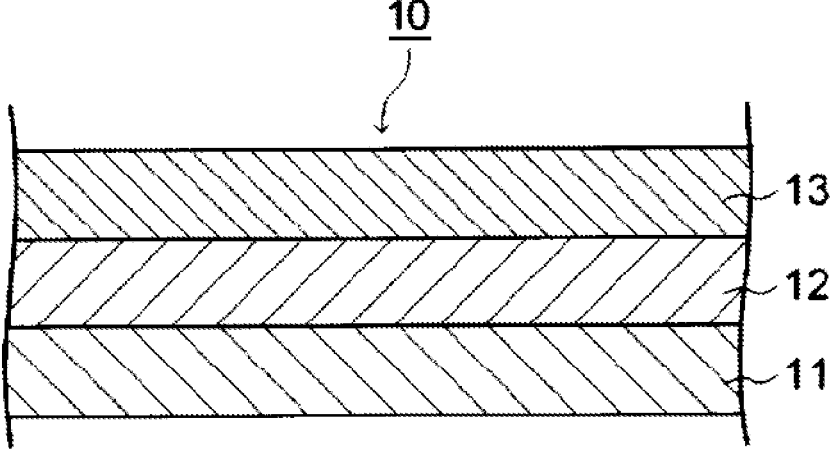
FIG. 1 is a schematic sectional view showing an embodiment of a barrier film of the present invention.

A layer structure of one embodiment of the barrier film of the present invention is described with reference to the drawings. A barrier film 10 shown in FIG. 1 comprises an inorganic oxide deposition layer 12 on or above one surface of a substrate layer 11, and a barrier coat layer 13 on or above the inorganic oxide deposition layer 12. The respective layers constituting the barrier film of the present invention are described hereinafter.

(Substrate Layer)

A resin film can be used as the substrate layer used in the barrier film of the present invention, although the present invention is not particularly limited thereto. The resin film may have excellent chemical and/or physical strength. The resin film may withstand conditions for manufacturing a deposition layer of an inorganic oxide. The resin film may retain well its film properties without damaging them. Specifically, it is possible to use, for example, various resin films made of a polyolefin resin such as a polyethylene resin or a polypropylene resin, a cyclic polyolefin resin, a polystyrene resin, an acrylonitrile-styrene copolymer (AS resin), an acrylonitrile-butadiene-styrene copolymer (ABS resins), a poly(meth)acrylic resin, a polycarbonate resin, a polyvinyl alcohol resin, an ethylene-vinyl ester copolymer saponified resin, a polyether resin such as polyethylene terephthalate, polyethylene naphthalate, etc., a polyamide resin such as various nylons, a polyurethane resin, an acetal resin, a cellulose resin, etc. In the present invention, among the aforementioned resin films, the use of a film made of a polyester resin, a polyolefin resin or a polyamide resin is preferred. Any of a cast film of the aforementioned resins, and a film of uniaxially or biaxially oriented resin film can be used as the substrate layer.

In addition to a common petrochemical fuel-derived polyethylene terephthalate, the following polyester films can be used as a polyester resin film.

(Polybutylene Terephthalate Film (PBT))

A polybutylene terephthalate film has a high heat distortion temperature, excellent mechanical strength and electric properties, as well as good molding processability. Thus, when a polybutylene terephthalate film is used in a packaging pouch for accommodating contents such as foods, deformation of the packaging pouch and decrease of its strength can be suppressed during a retort treatment. A polybutylene terephthalate film is a film containing polybutylene terephthalate (hereinafter also referred to as PBT) as a main component, and is preferably a resin film containing 60% by mass or more of PBT.

(Biomass-Derived Polyester Film)

A biomass-derived polyester film comprises a resin composition containing as a main component a polyester consisting of diol unit and a dicarboxylic acid unit. The biomass-derived polyester film contains 50% to 95% by mass, preferably 50% to 90% by mass of polyester, with respect to a total resin composition, wherein the diol unit of the resin composition is a biomass-derived ethylene glycol, and the dicarboxylic acid unit thereof is a fossil fuel-derived dicarboxylic acid.

A raw material of the biomass-derived ethylene glycol is ethanol (biomass ethanol) manufactured from biomass such as sugar cane and/or corn as a raw material. A biomass-derived ethylene glycol can be obtained by, for example, a method of producing ethylene glycol from, for example, a biomass ethanol through ethylene oxide by a conventionally known method. A commercially available biomass ethylene glycol can be used. For example, a biomass ethylene glycol commercially available from India Glycol Co. can be suitably used.

The dicarboxylic acid unit of the polyester uses a dicarboxylic acid derived from a fossil fuel. A dicarboxylic acid to be used may be an aromatic dicarboxylic acid, an aliphatic dicarboxylic acid, and their derivatives. An aromatic dicarboxylic acid may be a terephthalic acid and an isophthalic acid, etc. A derivative of an aromatic dicarboxylic acid may be a lower alkyl ester of an aromatic dicarboxylic acid, specifically, a methyl ester, an ethyl ester, a propyl ester, a butyl ester, etc. Among these, a terephthalic acid is preferred. A dimethyl terephthalate is preferred as a derivative of aromatic dicarboxylic acid.

A fossil fuel-derived polyester, a recycled polyester of a fossil fuel-derived polyester product, or a recycled polyester of a biomass-derived polyester product may be contained in the resin composition forming the biomass-derived polyester film at a ratio of 5% to 45% by mass.

(Recycled Polyethylene Terephthalate)

A recycled polyethylene terephthalate film is a polyethylene terephthalate film containing a polyethylene terephthalate recycled by mechanical recycling. Specifically, the recycled polyethylene terephthalate film contains PET recycled from a PET bottle by mechanical recycling. The PET contains an ethylene glycol as a diol component and a terephthalic acid and an isophthalic acid as a dicarboxylic acid component. A content of the isophthalic acid is preferably 0.5 mole % or more and 5 mole % or less, preferably, 1.0 mole % or more and 2.5 mole % or less, in the total dicarboxylic acid component of PET.

Mechanical recycling generally means the following method. A collected polyethylene terephthalate resin product, such as a PET bottle, is crushed and alkaline-washed to remove contaminants and foreign matters on a surface of the PET resin product. Then, the crushed product is dried under a high temperature and a reduced pressure for a certain period of time, to diffuse and decontaminate contaminants trapped inside the PET resin. Then, contaminates of the resin product made of a PET resin are removed, and the resin product is against returned to a PET resin.

A recycled polyethylene terephthalate preferably contains 50% or more and 95% or less by weight of recycled PET, and may contain virgin PET. A virgin PET may be general PET wherein a diol component is an ethylene glycol and a dicarboxylic acid component is a terephthalic acid. A virgin PET may contain an isophthalic acid.

A thickness of various resin films is preferably 6 μm to 2000 μm, and more preferably 9 μm to 100 μm.

In the present invention, before an inorganic oxide deposition layer is formed on the aforementioned substrate layer, the substrate layer may be subjected to a surface treatment in advance. This can improve adhesiveness to the inorganic oxide deposition layer. Similarly, adhesiveness to a bas barrier coating layer can be improved by subjecting the deposition layer to a surface treatment. Such a surface treatment may be a pretreatment such as a corona discharge treatment, an ozone treatment, a low-temperature plasma treatment using an oxygen gas or a nitrogen gas, a glow discharge treatment, an oxidation treatment using a chemical agent, etc.

In addition, a primer coating agent, an undercoating agent, or a deposition anchor coating agent may be optionally applied as a surface treatment. The aforementioned coating agents to be used may use, for example, a polyester resin, a polyamide resin, a polyurethane resin, an epoxy resin, a phenol resin, a (meth)acrylic resin, a polyvinyl acetate resin, a polyolefin resin such as polyethylene or polypropylene, or a copolymer or a modified resin thereof, and a resin composition in which a cellulose resin is a main component of a vehicle.

Among these surface treatments, a corona treatment and a plasma treatment are particularly suitable. For example, a plasma treatment utilizes a plasma gas generated by ionizing a gas with an arc discharge for surface modification. In addition to the above, the plasma gas to be used may be an inorganic gas such as an oxygen gas, a nitrogen gas, an argon gas, a helium gas, etc. For example, an in-line plasma treatment can remove moisture, dust, etc. from the surface of the substrate layer. In addition, a surface treatment of the surface, such as smoothing and activation can be done. Moreover, a plasma treatment can also be performed after deposition to improve adhesiveness. In a plasma treatment of the present invention, a plasma discharge treatment is preferably performed in consideration of a plasma output, a plasma gas type, an amount of a plasma gas to be supplied, a treatment time and other conditions. In a method of generating a plasma, a device such as a DC glow discharge, a high-frequency discharge, a microwave discharge, etc. can be used. A plasma treatment can also be performed by an atmospheric plasma treatment method.

(Inorganic Oxide Deposition Layer)

The inorganic oxide deposition layer constituting the barrier film according to the present invention is a deposition layer of an inorganic oxide formed by a chemical vapor deposition (CVD) method or a physical vapor deposition (PVD) method. The inorganic oxide deposition layer may be formed of one deposition layer or two or more deposition layers.

A deposition layer made of one or more oxides of silicon, aluminum, magnesium, calcium, potassium, tin, sodium, boron, titanium, lead, zirconium, yttrium, etc. may be used, although an inorganic oxide is not particularly limited. In particular, the inorganic oxide deposition layer is preferably a deposition layer of aluminum oxide or silicon oxide. A deposition layer of aluminum oxide is more preferred. Notation of an inorganic oxide is represented as, for example, $MO_x$ such as $AlO_x$, $SiO_x$, etc. (wherein M represents an inorganic element, and a range of a value of X varies depending on the inorganic element). In the present invention, from the viewpoint of transparency and gas barrier properties, when M is aluminum (Al), a value of X is preferably 0.5 to 1.5, and when M is silicon (Si), a value of X is preferably 1 to 2.

The inorganic oxide deposition layer is preferably an aluminum oxide deposition layer formed by a physical vapor deposition method because of its ease of handling as a deposition material. The aluminum oxide deposition layer formed by a physical vapor deposition method has excellent adhesiveness to a surface of a gas barrier coating layer. A physical vapor deposition method (PVD method) may be, for example, a vacuum deposition method, a sputtering method, an ion plating method, an ion cluster beam method, etc.

Specifically, a deposition layer may be formed by a vacuum deposition method which uses aluminum or its oxide as a raw material, heats and vaporize it, and deposits it on one of substrate layers. The vacuum deposition method may be, for example, an oxidation reaction deposition method which uses aluminum or its oxide as a raw material, introduces oxygen to oxidize it, and deposits it on one of substrate layers. The oxidation reaction deposition method may be a plasma-assisted oxidation reaction deposition method which assists an oxidation reaction with plasma. A heating method of a deposition material may be a resistance heating method, a high-frequency induction heating, an electron beam heating method (EB), etc.

When the inorganic oxide deposition layer is a silicon oxide deposition layer, the silicon oxide deposition layer is preferably provided by a chemical vapor deposition method from the viewpoint of bending resistance and gas barrier properties. A chemical vapor deposition method (CVD method) may be a plasma chemical vapor deposition method, a low-temperature plasma chemical vapor deposition method, a thermal chemical vapor deposition method, a photochemical vapor deposition method, etc. Specifically, a silicon oxide deposition layer may be formed on one surface of the substrate layer by means of the low-temperature plasma chemical vapor deposition method. In the low-temperature plasma chemical vapor deposition method, a deposition monomer gas of an organosilicon compound is used as a raw material, an inert gas such as an argon gas, a helium gas, etc. is used as a carrier gas, an oxygen gas is used as an oxygen supply gas, and low-temperature plasma generation apparatus is used. The low-temperature plasma generation apparatus may be, for example, an apparatus for generating a high-frequency plasma, a pulsed-wave plasma, a microwave plasma, etc. The use of a generation apparatus of a high-frequency plasma type is preferred because a highly active and stable plasma can be obtained A deposition monomer gas of an organosilicon compound for forming a silicon oxide deposition layer to be used may be, for example, 1,1,3,3-tetramethyldisiloxane, hexamethyldisiloxane, vinyltrimethylsilane, methyltrimethylsilane, hexamethyldisilane, methyl silane, dimethyl silane, trimethyl silane, diethyl silane, propylsilane, phenylsilane, vinyltriethoxysilane, vinyltrimethoxysilane, tetramethoxysilane, tetraethoxysilane, phenyltrimethoxysilane, methyltriethoxysilane, octamethylcyclotetrasiloxane, etc. Among these, the use of 1,1,3,3-tetramethyldisiloxane or hexamethyldisiloxane as a raw material is particularly preferred due to its ease of handling and properties of a continuous layer to be formed. In the above, an inert gas to be used may be, for example, an argon gas, a helium gas, etc.

A deposition layer of silicon oxide is mainly composed of silicon oxide. However, it may further contain at least one compound consisting of one or more elements of carbon, hydrogen, nitrogen, silicon or oxygen, by chemical bonding, etc. For example, a deposition layer of silicon oxide may contain a compound with a C—H bond, a compound with an Si—H bond. In case that a carbon unit is like graphite, diamond, fullerene, etc., a deposition layer of silicon oxide may contain an organosilicon compound of a raw material and its derivative, by chemical bonding. For example, it may be a hydroxyl derivative such as a hydrocarbon with $CH_3$ moieties, a hydrosilica such as $SiH_3$ silyl, $SiH_2$ silylene, $SiH_2OH$ silanol, etc. In addition to the above, a type and an amount of a compound contained in a silicon oxide deposition layer may be varied by changing conditions of a deposition process.

A thickness of the inorganic oxide deposition layer is preferably 3 nm to 100 nm, more preferably 5 nm to 50 nm, and further preferably 8 nm to 30 nm. The inorganic oxide deposition layer having a layer thickness within the above range can have gas barrier properties which hardly deteriorate even after a moist heat sterilization treatment (retort treatment).

(Barrier Coat Layer)

A barrier coat layer constituting the barrier film according to the present invention is a layer having gas barrier properties, and is preferably a coating layer. Further, the barrier coat layer is preferably a cured layer of a hydrolysis product of a metal alkoxide and a water-soluble polymer. The barrier coat layer may be formed by a gas barrier coating layer described below. A gas barrier coating layer is a coating layer which retains gas barrier properties in a high temperature and high humidity environment. The gas barrier coating layer consists of a coating layer obtained by polycondensing a gas barrier composition by a sol-gel method. The gas barrier composition contains at least one or more metal alkoxide which is represented as a general formula $R^1{}_nM(OR^2)_m$ (wherein $R^1$, $R^2$ represents an organic group with 1-8 carbons, M represents a metal atom, n represents an integer of 0 or more, m represents an integer of 1 or more, and n+m represents a valence of M), a water-soluble polymer, a sol-gel catalyst, acid, water and an organic solvent.

In the aforementioned general formula $R^1{}_nM(OR^2)_m$, $R^1$ is an alkyl group which may have a branch, with 1 to 8 carbons, preferably 1 to 5 carbons, and more preferably 1 to 4 carbons. For example, it may be a methyl group, an ethyl group, an n-propyl group, an i-propyl group, an n-butyl group, an i-butyl group, a sec-butyl group, a t-butyl group, an n-hexyl group, an n-octyl group, etc.

In the aforementioned general formula $R^1{}_nM(OR^2)_m$, $R^2$ is an alkyl group which may have a branch, with 1 to 8 carbons, preferably 1 to 5 carbons, and more preferably 1 to 4 carbons. $R^2$ may be, for example, a methyl group, an ethyl group, an n-propyl group, i-propyl group, n-butyl group, a sec-butyl group, etc. When there are a plurality of $(OR^2)$ in one and the same molecule, $(OR^2)$ may be the same or different.

A metal atom represented by M in the aforementioned general formula $R^1{}_nM(OR^2)_m$, may be silicon, zirconium, titanium, aluminum, etc., for example.

The alkoxide represented by the above general formula $R^1{}_nM(OR^2)_m$ to be used may be at least one or more of a partial hydrolysis product of alkoxide and a hydrolytic condensation product of alkoxide. The aforementioned partial hydrolysis product is not limited to one in which all the alkoxy groups are hydrolyzed, but may also be one in which one or more of alkoxy group is hydrolyzed, or mixture thereof. Further, the above hydrolytic condensation product of alkoxide to be used may be a dimer or more of the partially hydrolyzed alkoxide, specifically, a dimer to hexamer of the partially hydrolyzed alkoxide.

In the present invention, the alkoxide represented by the above general formula $R^1{}_nM(OR^2)_m$ to be suitably used is an alkoxysilane in which M is Si. A suitable alkoxysilane may be, for example, tetramethoxysilane $Si(OCH_3)_4$, tetraethoxysilane $Si(OC_2H_5)_4$, tetrapropoxysilane $Si(OC_3H_7)_4$, tetrabutoxysilane $Si(OC_4CH_9)_4$, methyltrimethoxysilane $CH_3Si(OCH_3)_3$, methyltrimethoxysilane $CH_3Si(OC_2H_5)_3$, dimethyldimethoxysilane $(CH_3)_2Si(OCH_3)_2$, dimethyldiethoxysilane $(CH_3)_2Si(OC_2H_5)_2$, etc. In the present invention, a condensation polymerization product of these alkoxysilanes can also be used. Specifically, for example, polytetramethoxysilane, polytetraemethoxysilane, etc. can be used.

The water-soluble polymer used in the present invention may be a polyvinyl alcohol resin or an ethylene vinyl alcohol copolymer, each of which may be used alone. Alternatively, a polyvinyl alcohol resin and an ethylene vinyl alcohol copolymer may be used in combination. In the present invention, the use of a polyvinyl alcohol resin and/or an ethylene vinyl alcohol copolymer can significantly improve physical properties such as gas barrier properties, water resistance, weather resistance, and others.

A resin obtained by saponifying polyvinyl acetate can be generally used as the polyvinyl alcohol resin. The polyvinyl alcohol resin is not particularly limited, and may be a partially saponified polyvinyl alcohol resin in which several tens of percent of the acetate group remains, or a fully saponified polyvinyl alcohol in which no acetate group remains, or a modified polyvinyl alcohol resin in which the OH group has been modified.

A saponified copolymer of ethylene and vinyl acetate, i.e., a copolymer obtained by saponifying an ethylene vinyl acetate random copolymer can be used as the ethylene vinyl alcohol copolymer. For example, the ethylene vinyl alcohol copolymer is not particularly limited, and it includes from a partial saponification in which several tens of moles of acetate groups remains, to a complete saponification in which several of moles of acetate groups remains or no acetate group remains. From the viewpoint of gas barrier properties, a degree of saponification is preferably 80 mole % or more, more preferably 90 mole % or more, and further preferably 95 mole % or more. A content of ethylene-derived repeating units (hereinafter referred to as "ethylene content") in the above ethylene vinyl alcohol copolymer is usually 0 mole % to 50 mole %, preferably 20 mole % to 45 mole %.

In addition, a silane coupling agent may be added to the barrier coat layer. For example, a silane coupling agent having a reactive group, such as an alkoxy group such as a methoxy group or an ethoxy group, an acetoxy group, an amino group, an epoxy group, etc., can be used.

Further, an organic solvent to be used in the aforementioned gas barrier composition may be methyl alcohol, ethyl alcohol, n-propyl alcohol, isopropyl alcohol, n-butanol, etc. The aforementioned polyvinyl alcohol resin and/or the ethylene vinyl alcohol copolymer is preferably handled in a dissolved state in a coating liquid containing the aforementioned alkoxide and/or the silane coupling agent, and can be suitably selected from the aforementioned organic solvents. For example, when the polyvinyl alcohol resin and the ethylene vinyl alcohol copolymer may be used in combination, n-butanol is preferably used.

The barrier coat layer constituting the barrier film according to the present invention has a hardness of 1.10 GPa or more and 1.55 GPa or less, and a plastic deformation rate of 21.0% or more. This can suppress deterioration of gas barrier properties even after a retort treatment and after a Gelboflex test. The hardness and the plastic deformation rate of the barrier coat layer are values measured by a nanoindentation method. The nanoindentation method can evaluate a plasticity/elasticity, a deformation rate, a Young's modulus, etc. of a thin layer by indenting an indenter into a micro region of less than 1 $\mu m^2$. The plastic deformation rate is an index of a degree to which a displacement (maximum displacement) caused when a predetermined load is applied to a sample returns to its original state after unloading. The hardness of the barrier coat layer is calculated from the following formula (1). The plastic deformation rate of the barrier coat layer is calculated by the following formula (2) based on a result of the nanoindentation measurement (load-displacement curve).

$$\text{Hardness} = P_{max} \times A \qquad (1)$$

$$\text{Plastic deformation rate} = W_{plast}/W_{total} \times 100 \qquad (2)$$

$P_{max}$: Maximum load (unit: μN)

A: Contact projection area at maximum depth (unit: $\mu m^2$)

$W_{plast}$: Plastic workload calculated from load-displacement curve $W_{total}$: Maximum workload calculated from load-displacement curve Next, a specific measurement by the nanoindentation method is described.

First, a test piece is prepared by cutting a measurement sample (barrier film, packaging material comprising barrier film, etc.) into a piece of about 20 mm×20 mm. Then, the test piece is put into a dedicated mold, and the mold is filled with a curable resin such as an epoxy resin. Then, the curable resin is cured, and a hardened cured product is taken out. Then, the cured product is cut through the center of the measurement sample in the cured product in a thickness direction of the measurement sample. Thus, a cross-section of the measurement sample is exposed to a surface of the cured product. The cross-section of the measurement sample is a surface where the barrier coat layer is exposed. The cross-section of the measurement sample is perpendicular to a lamination direction of each layer. The cutting can be performed using a commercially available rotary microtome or the like.

Following thereto, the cross-section of the barrier coat layer is measured by the nanoindentation method. A nanoindenter ("TI950 (TriboIndenter)" manufactured by HYSITRON company) is used as an apparatus. A Berkovich indenter (triangular pyramid) is used as an indenter of the nanoindenter. The measurement is performed under an environment with 50% relative humidity and 23° C.

The indenter is first brought into contact with the cross-section of the barrier coat layer. The indenter is then indented from the cross-section into the barrier coat layer with increasing a load to 15 μN in 10 seconds. Then, the state is held for 5 seconds. Following thereto, the indenter is unloaded with decreasing the load in 10 seconds. Thus, a maximum load $P_{max}$, a contact projection area at a maximum depth A, and a load-displacement curve can be obtained. A plastic work $W_{plast}$ and a maximum workload $W_{total}$ can be calculated from the obtained load-displacement curve. Values of the maximum load the contact projection area at a maximum depth A, the plastic work $W_{plast}$ and the maximum workload $W_{total}$ are average values of five measurements taken at different locations.

The hardness of the barrier coat layer is preferably 1.15 GPa or more, preferably 1.20 GPa or more, from the viewpoint of gas barrier properties after a retort treatment. In addition, the hardness of the barrier coat layer is preferably 1.50 GPa or less, preferably 1.45 GPa or less, and further preferably 1.40 GPa or less, from the viewpoint of gas barrier properties after a Gelboflex test.

The plastic deformation rate of the barrier coat layer is preferably 24.0% or more, preferably 26.0% or more, from the viewpoint of gas barrier properties after a Gelboflex test.

The barrier coat layer can be formed by a method as described below. A gas barrier composition (barrier coat liquid) is first prepared by mixing the aforementioned metal alkoxide, the aforementioned water-soluble polymer, a silane coupling agent, a sol-gel method catalyst, acid, water, an organic solvent, etc., as needed. In the preparation of the bas barrier composition, a solid content ratio (IO value) of the metal alkoxide to the water-soluble polymer is 2.2 to 3. This allows a barrier coat layer having the aforementioned hardness and the aforementioned plastic deformation rate to be formed.

Then, the gas barrier composition is applied to the inorganic oxide deposition layer. The gas barrier composition is applied in the following manner. For example, the gas barrier composition is applied once or more times by application means such as a roll coat such as a gravure roll coater, a spray cot, a spin coat, dipping, brushing, bar-code, an applicator, etc., such that a thickness of a dried layer becomes 0.01 μm to 30 μm, preferably 0.1 μm to 10 μm.

Following thereto, the film to which the gas barrier composition has been applied is heated and dried at a temperature which is 140° C. to 200° C. and which is equal to or less than a melting point of the resin film of the substrate layer, for about 1 second to 10 minutes. This causes polycondensation so that a barrier coat layer having the aforementioned hardness and the aforementioned plastic deformation rate is formed. In addition, a composite polymer layer in which two or more barrier coat layers are laminated may be formed by applying the barrier coat composition again to the inorganic oxide decomposition layer, and heating it at a temperature which is 140° C. to 200° C. and which is equal to or less than a melting point of the resin film of the substrate layer, for about 1 second to 10 minutes. Thus, one or more barrier coat layer(s) can be formed by the barrier coat composition.

<Packaging Material>

The packaging material according to the present invention at least comprises the barrier film of the present invention. Since the packaging material according to the present invention comprises the barrier film of the present invention, its gas barrier properties hardly deteriorate even after a retort treatment. In addition, because of its excellent bending resistance, its gas barrier properties hardly deteriorate even after a Gelboflex test. Thus, the packaging material of the present invention can be suitably used as a packaging material which is subjected to a retort treatment and is required to have bending resistance. The packaging material according to the present invention may comprise a heat sealing layer, a barrier layer comprising the barrier film of the present invention, and an outer layer, in this order.

An oxygen transmission rate of the packaging material, which is measured after a retort treatment at 135° C. for 40 minutes, in accordance with the JIS K7126 method under an environment with a temperature of 23° C. and a humidity of 90% RH, is preferably 1.8 $cc/m^2 \cdot atm \cdot day$ or less, more preferably 1.5 $cc/m^2 \cdot atm \cdot day$ or less, further preferably 1.0 $cc/m^2 \cdot atm \cdot day$ or less, and furthermore preferably 0.5 $cc/m^2 \cdot atm \cdot day$ or less. A packaging material whose oxygen transmission rate after a retort treatment satisfies the above numerical range can have suitable oxygen barrier properties. Thus, even when the packaging material is subjected to a retort treatment, it can suppress an adverse effect on contents of the packaging material.

An oxygen transmission rate of the packaging material, which is measured after a Gelboflex test in accordance with ASTM F392, in accordance with the JIS K7126 method under an environment with a temperature of 23° C. and a humidity of 90% RH, is preferably 0.55 $cc/m^2 \cdot atm \cdot day$ or less, more preferably 0.50 $cc/m^2 \cdot atm \cdot day$ or less, further preferably 0.40 $cc/m^2 \cdot atm \cdot day$ or less, and furthermore preferably 0.30 cc/m²·atm·day or less. A packaging material whose oxygen transmission rate after a Gelboflex test satisfies the above numerical range can have suitable oxygen barrier properties. Thus, even when the packaging material is required to have bending resistance, it can suppress an adverse effect on contents of the packaging material.

Figure 2:
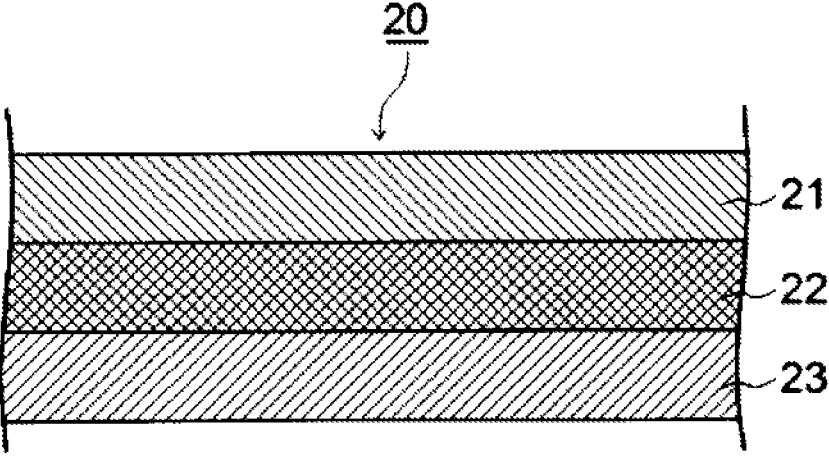
FIG. 2 is a schematic sectional view showing an embodiment of a packaging material of the present invention.

A layer structure of the one embodiment of the packaging material of the present invention is described with reference to the drawings. The packaging material 20 shown in FIG. 2 comprises an outer layer 21, a barrier layer 22 (barrier film), and a heat sealing layer 23, in this order from outside. Adhesive layers (not shown) may be present between the outer layer 21 and the barrier layer 22, and between the barrier layer 22 and the heat sealing layer 23, respectively. The outer layer does not necessarily mean an outermost layer of the packaging material, and the packaging material may comprise a further layer outside the outer layer.

The barrier layer may comprise the barrier coat layer, the inorganic oxide deposition layer and the substrate layer, in this order from outside, or may comprise the substrate layer, the inorganic oxide deposition layer and the barrier coat layer, in this order from outside. From the viewpoint of gas barrier properties, the barrier layer preferably comprises the barrier coat layer, the inorganic oxide deposition layer and the substrate layer, in this order from outside.

The respective layers constituting the packaging material of the present invention are described hereinafter. Since the barrier layer in the packaging material is the barrier film as has been described above, its description is omitted.

(Outer Layer)

In the packaging material of the present invention, various resin layers and/or resin films can be used as an outer layer for providing durability, bending resistance, etc. to the packaging material. For example, a polyester resin, a polyolefin resin, or a polyamide resin can be used as the outer layer. The use of a polyamide resin is preferred. The polyamide resin may be nylons such as polycaproamide (nylon 6), poly-ω-aminoheptanoic acid (nylon 7), poly-9-amino nonanoic acid (nylon 9), polyundecanamide (nylon 11), polylaurin lactam (nylon 12), polyethylene diamine adipamide (nylon 2,6), polytetramethylene adipamide (nylon 4,6), polyhexamethylene diazipamide (nylon 6,6), polyhexamethylene sevacaamide (nylon 6,10), polyhexamethylenedodecamide (nylon 6,12), polyoctamethylene adipamide (nylon 8,6), polydecamethylene adipamide (nylon 10,6), polydecamethylene sebacamide (nylon (nylon 10,10), polydodecamethylene dodecamide (nylon 12,12), metaxylenediamine-6 nylon (MXD6), etc. In addition, nylon 6-6,6, which is a copolymer of nylon 6 and nylon 6,6, nylon 6-12, which is a copolymer of nylon 6 and nylon 6-12, etc., can also be used. The use these nylons can provide bending resistance to the packaging material. A method of manufacturing the outer layer is not particularly limited, and can be formed by any conventional known method. For example, the outer layer may be formed by extrusion molding of a resin. A resin film may also be used.

A thickness of the outer layer is not particularly limited, but is preferably 5 μm to 100 μm, and more preferably 10 μm to 50 μm.

(Heat Sealing Layer)

In the packaging material of the present invention, a thermoplastic resin may be used as the heat sealing layer. The thermoplastic resin to be used may be, for example, a low density polyethylene, a medium density polyethylene, a high density polyethylene, a linear low density polyethylene, an ethylene-α-olefin copolymer polymerized using a metallocene catalyst, polypropylene, an ethylene-vinyl acetate copolymer, an ionomer resin, an ethylene-acrylic acid copolymer, an ethylene-ethyl acrylate copolymer, an ethylene-methacrylic acid copolymer, an ethylene-methyl methacrylate copolymer, an ethylene-propylene copolymer, a methylpentene polymer, a polybutene polymer, a polyolefin resin such as polyethylene or polypropylene, an acid-modified polyolefin resin made by modifying these polyolefin resins with unsaturated a carboxylic acid such as acrylic acid, methacrylic acid, maleic acid, maleic anhydride, fumaric acid, itaconic acid, etc., polyvinyl acetate resin, poly(meth)acrylic resins, polyvinyl chloride resin, etc.

The heat sealing layer can be formed by melt-extruding one or more of the aforementioned thermoplastic resins by means of an extruder to the outer layer via an anchor coat layer or the like according to need. Alternatively, the heat sealing layer may formed as follows. Namely, a film or sheet is manufactured by using one or more of the aforementioned thermoplastic resins, and the manufactured film or sheet is dry laminated on the outer layer via a lamination adhesive layer or the like.

Other resins can be blended to the aforementioned resins in order to obtain desired properties. In addition, various additives, such as an antioxidant, a UV absorber, an antistatic agent, an antiblocking agent, a lubricant (fatty acid amides, etc.), a flame retardant, an inorganic or organic filler, a dye, a pigment, etc., may be added as desired.

A thickness of the heat sealing layer is not particularly limited, but is preferably 10 μm to 300 μm, and more preferably 20 μm to 100 μm.

(Adhesive Layer)

The packaging material of the present invention may further comprise adhesive layers between the outer layer and the barrier layer, and between the barrier layer and the heat sealing layer, respectively. The adhesive layer may be an adhesive resin layer, an adhesive agent layer, etc. The packaging material comprising an adhesive layer can have an improved lamination strength of an interface between the respective layers.

A thermoplastic resin to be used in the adhesive resin layer may be, for example, a polyethylene resin, a polypropylene resin, or a cyclic polyolefin resin, or a copolymer resin containing these resins as a main component, a modified resin, or a mixture (including alloy). The polyolefin resin to be used may be, for example, a low density polyethylene (LDPE), a medium density polyethylene (MDPE), a high density polyethylene (HDPE), a linear low-density polyethylene (LLDPE), polypropylene (PP), an ethylene-α-olefin copolymer polymerized using metallocene catalyst, a random or block copolymer of ethylene-polypropylene, an ethylene-vinyl acetate copolymer (EVA), an acrylic acid copolymer (EAA), an ethylene-ethyl acrylate copolymer (EEA), an ethylene-methacrylic acid copolymer (EMAA), an ethylene-methyl methacrylate copolymer (EMMA), an ethylene-maleic acid copolymer, an ionomer resin, or an acid-modified polyolefin resin made by modifying these polyolefin resins with unsaturated a carboxylic acid such as acrylic acid, methacrylic acid, maleic acid, maleic anhydride, fumaric acid, itaconic acid, etc., in order to improve adhesiveness between layers. A polyolefin resin grafted or copolymerized with unsaturated carboxylic acids, unsaturated carboxylic anhydrides, or ester monomers may also be used. One or more of these materials can be used in combination. As cyclic polyolefin resins, for example, cyclic polyolefins such as ethylene-propylene copolymers, polymethylpentene, polybutene, and polynorbonene may be used. One or more of these resins can be used in combination.

An adhesive agent to be used may be, for example, one or more of a one-component or two-component curing or non-curing type of vinyl adhesive agent, a (meth)acrylic adhesive agent, a polyamide adhesive agent, a polyester adhesive agent, a polyether adhesive agent, a polyurethane adhesive agent, an epoxy adhesive agent, a rubber adhesive agent, a solvent-based adhesive agent, a water-based adhesive agent, an emulsion-type adhesive agent, etc. The lamination adhesive agent may be applied to an application surface of a layer constituting the barrier laminate by a coating method such as a direct gravure roll coating method, a gravure roll coating method, a kiss coating method, a reverse roll coating method, a fountain method, a transfer roll coating method, or another method. An application amount is preferably 0.1 g/m$^2$ or more and 10 g/m$^2$ or less (dry state), and more preferably 1 g/m$^2$ or more and 5 g/m$^2$ or less (dry state).

EXAMPLES

The present invention is described hereinafter with reference to examples, but the present invention is not limited to the below examples.

Example 1

A biaxially oriented polyethylene terephthalate film (hereinafter referred to as "PET film") having a thickness of 12 μm was prepared as a substrate layer. A surface of the PET film, which is to form an inorganic oxide deposition layer, was subjected to a plasma pretreatment. Consecutively, an aluminum oxide deposition layer (inorganic oxide deposition layer) having a thickness of 12 nm was formed on the plasma-treated surface under the following conditions, by a reactive resistance heating method as heating means of a vacuum deposition method.

(Aluminum Oxide Layer Formation Conditions)

Degree of Vacuum: $8.1 \times 10^{-2}$ Pa

According to the composition shown in Table 1, a prepared mixture liquid of B composition (B liquid) was added to a hydrolyzed solution of A composition (A liquid), which had been prepared in advance, and they were stirred to obtain a colorless and transparent barrier coat composition. A unit of each composition of Table 1 is a mass part. An IO value in Table 1 is a solid content ratio of tetraethoxysilane to polyvinyl alcohol. The IO value of the example is 2.2.

Then, the barrier coat composition as prepared above was coated on the aluminum oxide deposition layer of the PET film by a direct gravure method. Thereafter, the barrier coat composition was heated at 140° C. for 30 seconds to form a barrier coat layer having a thickness of 300 nm (dry state) to obtain a barrier film.

Following thereto, a PET film (12 μm thick) was laminated on the barrier coat layer of the thus obtained barrier film via an adhesive agent. Further, a cast polypropylene film (CPP, 70 μm thick) was laminated on a substrate layer of the barrier film via an adhesive agent to obtain a packaging material. The packaging material has the following layer structure.

PET film (outer layer)/barrier coat layer/aluminum oxide deposition layer/substrate layer/CPP film (sealant layer)

Example 2

A barrier film was obtained in the same manner as Example 1 except that the IO value of the barrier coat composition was 2.6 by changing a mixing ratio between A liquid and B liquid.

Following thereto, a packaging material was obtained using the thus obtained barrier film in the same manner as Example 1.

Example 3

A barrier film was obtained in the same manner as Example 1 except that the IO value of the barrier coat composition was 3.0 by changing a mixing ratio between A liquid and B liquid.

Following thereto, a packaging material was obtained using the thus obtained barrier film in the same manner as Example 1.

Example 4

A barrier film was obtained in the same manner as Example 2 except that 3-glycidoxypropyltrimethoxysilane was used as a silane coupling agent.

Following thereto, a packaging material was obtained using the thus obtained barrier film in the same manner as Example 1.

Comparative Example 1

A barrier film was obtained in the same manner as Example 1 except that the IO value of the barrier coat composition was 2.0 by changing a mixing ratio between A liquid and B liquid.

Following thereto, a packaging material was obtained using the thus obtained barrier film in the same manner as Example 1.

Comparative Example 2

A barrier film was obtained in the same manner as Example 1 except that the IO value of the barrier coat composition was 3.4 by changing a mixing ratio between A liquid and B liquid.

Following thereto, a packaging material was obtained using the thus obtained barrier film in the same manner as Example 1.

Comparative Example 3

A barrier film was obtained in the same manner as Comparative Example 2 except that 3-glycidoxypropyltrimethoxysilane was used as a silane coupling agent.

Following thereto, a packaging material was obtained using the thus obtained barrier film in the same manner as Example 1.

Comparative Example 4

A barrier film was obtained in the same manner as Example 2 except that a temperature in the drying conditions of the barrier coat composition was changed to 120° C.

Following thereto, a packaging material was obtained using the thus obtained barrier film in the same manner as Example 1.

Comparative Example 5

A barrier film was obtained in the same manner as Example 2 except that a temperature in the drying conditions of the barrier coat composition was changed to 100° C.

Following thereto, a packaging material was obtained using the thus obtained barrier film in the same manner as Example 1.

Comparative Example 6

A barrier film was obtained in the same manner as Example 2 except that a temperature in the drying conditions of the barrier coat composition was changed to 80° C.

Following thereto, a packaging material was obtained using the thus obtained barrier film in the same manner as Example 1.

A, the plastic work $W_{plast}$ and the maximum workload $W_{total}$ are average values of five measurements taken at different locations.

<Barrier Property Evaluation of Barrier Film>

The barrier film manufactured by each of the aforementioned examples and comparative examples was set in an oxygen transmission rate measuring apparatus (model name: OX-TRAN 2/21 manufactured by MOCON company) such that oxygen was supplied toward the substrate layer surface of the barrier film, and an oxygen transmission rate of the barrier film was measured under measurement conditions of

TABLE 1

| | | Ex. 1 | Ex. 2 | Ex. 3 | Ex, 4 | Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|
| A liquid | Tetraethoxysilane (solid content: 28%) | | | | | | 27.04 | | | | |
| | Water | | | | | | 47.59 | | | | |
| | Isopropyl alcohol | | | | | | 22.80 | | | | |
| | 0.5N hydrochloric acid solution | | | | | | 1.13 | | | | |
| | 3-glycidoxypropylmethyldimethoxysilane | 1.35 | 1.35 | 1.35 | — | 1.35 | 1.35 | | 1.35 | 1.35 | 1.35 |
| | 3-glycidoxypropytrimethoxysilane | — | — | — | 1.35 | — | — | 1.35 | — | — | — |
| B liquid | Polyvinyl alcohol (solid content: 100%) | | | | | | 4.14 | | | | |
| | Water | | | | | | 91.07 | | | | |
| | Isopropyl alcohol | | | | | | 4.79 | | | | |
| | A liquid/B liquid | 55/45 | 59/41 | 62/38 | 59/41 | 52/48 | 65/35 | 65/35 | 59/41 | 59/41 | 59/41 |
| IO value (solid content ratio of tetraethoxysilane to polyvinyl alcohol) | | 2.2 | 2.6 | 3.0 | 2.6 | 2.0 | 3.4 | 3.4 | 2.6 | 2.6 | 2.6 |
| Dry conditions | Temperature (° C.) | 140 | 140 | 140 | 140 | 140 | 140 | 140 | 120 | 100 | 80 |
| | Time (second) | 30 | 30 | 30 | 30 | 30 | 30 | 30 | 30 | 30 | 30 |

<Measurement of Hardness and Plastic Deformation Rate>

A test piece was prepared by cutting the packaging material, which had been obtained in each of the aforementioned examples and comparative examples, into a piece of about 20 mm×20 mm. Then, the test piece was put into a dedicated mold, and the mold was filled with an epoxy resin as a curable resin. Then, the curable resin was cured, and a hardened cured product was taken out. Then, the cured product was cut through the center of the packaging material in a thickness direction of the measurement sample. Thus, a cross-section of the packaging material (a surface in which the barrier coat layer is exposed and which is perpendicular to a lamination direction of each layer) was exposed to a surface of the cured product. The cutting was performed with a rotary microtome.

Then, the cross-section of the barrier coat layer was measured by the nanoindentation method. A nanoindenter ("TI950 (TriboIndenter)" manufactured by HYSITRON company) was used as an apparatus. A Berkovich indenter (triangular pyramid) was used as an indenter of the nanoindenter. The measurement was performed under an environment with 50% relative humidity and 23° C. The indenter was first brought into contact with the cross-section of the barrier coat layer. The indenter was then indented from the cross-section into the barrier coat layer with increasing a load to 15 μN in 10 seconds. Then, the state was held for 5 seconds. Thereafter, the indenter was unloaded with decreasing the load in 10 seconds. Thus, a maximum load $P_{max}$, a contact projection area at a maximum depth A, and a load-displacement curve were obtained. A plastic work $W_{plast}$ and a maximum workload $W_{total}$ were calculated from the obtained load-displacement curve. Table 2 shows the respective values. The respective values of the maximum load $P_{max}$, the contact projection area at a maximum depth an environment with 23° C. and 90% RH in accordance with the JIS K7126 method. Table 2 shows the measurement result.

<Barrier Property Evaluation of Packaging Material (After Retort Treatment)>

The packaging material manufactured by each of the aforementioned examples and comparative examples was subjected to a retort treatment at 135° C. for 40 minutes. Thereafter, a test sample obtained by cutting a part of the packaging material was set in an oxygen transmission rate measuring apparatus (model name: OX-TRAN 2/21 manufactured by MOCON company) such that oxygen was supplied toward the substrate layer surface of the barrier film, and an oxygen transmission rate ($cc/m^2 \cdot atm \cdot day$) of the test sample was measured under measurement conditions of an environment with 23° C. and 90% RH in accordance with the JIS K7126 method. Table 2 shows the measurement result.

<Barrier Property Evaluation of Packaging Material (After Retort Treatment)>

The packaging material manufactured by each of the aforementioned examples and comparative examples was formed into a cylindrical shape, and was subjected to a Gelboflex test 10 times in accordance with ASTM F392. Thereafter, a test sample obtained by cutting a part of the packaging material was set in an oxygen transmission rate measuring apparatus (model name: OX-TRAN 2/21 manufactured by MOCON company) such that oxygen was supplied toward the substrate layer surface of the barrier film, and an oxygen transmission rate ($cc/m^2 \cdot atm \cdot day$) of the test sample was measured under measurement conditions of an environment with 23° C. and 90% RH in accordance with the JIS K7126 method. Table 2 shows the measurement result.

TABLE 2

| | Plastic deformation rate (%) | Hardness (GPa) | Barrier Film Oxygen transmission rate (cc/m² · atm · day) | Packaging Material (after retort treatment) Oxygen transmission rate (cc/m² · atm · day) | Packaging Material (after Gelboflex test) Oxygen transmission rate (cc/m² · atm · day) |
|---|---|---|---|---|---|
| Ex. 1 | 26.2 | 1.14 | 0.1 | 0.2 | 0.22 |
| Ex. 2 | 28.4 | 1.28 | 0.1 | 0.1 | 0.26 |
| Ex. 3 | 24.2 | 1.45 | 0.1 | 0.1 | 0.48 |
| Ex. 4 | 29.8 | 1.35 | 0.1 | 0.1 | 0.25 |
| Comp. Ex. 1 | 24.4 | 1.07 | 0.1 | 3 | 0.16 |
| Comp. Ex. 2 | 20.4 | 1.58 | 0.1 | 0.1 | 0.63 |
| Comp. Ex. 3 | 18.4 | 1.6 | 0.1 | 0.1 | 0.58 |
| Comp. Ex. 4 | 28.4 | 1.05 | 0.1 | 2 | 0.21 |
| Comp. Ex. 5 | 29.2 | 0.95 | 0.1 | 3.1 | 0.24 |
| Comp. Ex. 6 | 28.7 | 0.84 | 0.1 | 2.6 | 0.16 |

10: Barrier film
11: Substrate layer
12: Inorganic oxide deposition layer
13: Barrier coat layer
20: Packaging material
21: Heat sealing layer
22: Barrier layer (barrier film)
23: Outer layer

The invention claimed is:

1. A barrier film comprising a barrier coat layer, an inorganic oxide deposition layer, and a substrate layer, in this order, wherein the barrier coat layer is a coating layer of a barrier coat composition including a metal alkoxide, a water-soluble polymer and a methoxysilane coupling agent, wherein the metal alkoxide is present in the barrier coat layer in an amount of 62 to 66 wt % based on the amount of solids of the barrier coat layer and consists of at least one metal alkoxide represented by $R^1{}_n M (OR^2)_m$, where $R^1$ and $R^2$ are each independently straight or branched alkyl having 1-8 carbon atoms, n is 0 or a positive integer, m is an integer of 1 or more, n+m equals the valence of M, and M is selected from the group consisting of silicon, zirconium, titanium and aluminum, or a hydrolysis product or hydrolytic condensation product thereof, wherein the water-soluble polymer is present in the barrier coat layer in an amount of 22 to 28 wt % based on the amount of solids of the barrier coat layer and consists of at least one selected from the group consisting of polyvinyl alcohol resin and ethylene vinyl alcohol copolymer, wherein the methoxysilane coupling agent is present in an amount of 10 to 12 wt % based on the amount of solids of the barrier coat layer and consists of at least one selected from the group consisting of a 3-glycidoxypropylmethyldimethoxysilane and a 3-glycidoxypropyltrimethoxysilane, wherein the barrier coat layer is produced from a mixture of (A) a first liquid that consists essentially of the metal alkoxide, water, organic solvent, acid, and the coupling agent and (B) a second liquid that consists essentially of the water-soluble polymer, water, and organic solvent, the mixture being applied to the inorganic oxide deposition layer and dried at a temperature in a range of 140° C. to 200° C. for a time of from 1 second to 10 minutes that results in polycondensation, wherein a solid content ratio (IO value) of the metal alkoxide to the water-soluble polymer is 2.2 to 3.0, and wherein the barrier coat layer has a hardness of 1.10 GPa or more and 1.55 GPa or less, and a plastic deformation rate of 21.0% or more.

2. The barrier film according to claim 1, wherein the inorganic oxide deposition layer is an aluminum oxide deposition layer or a silicon oxide deposition layer.

3. The barrier film according to claim 1, wherein the metal alkoxide is a tetraethoxysilane, and wherein the water-soluble polymer is a polyvinyl alcohol resin.

4. The barrier film according to claim 1, wherein the barrier film has an oxygen transmission rate of 1.0 cc/m²·atm·day or less, the oxygen transmission rate being measured in accordance with the JIS K7126 method under an environment with a temperature of 23° C. and a humidity of 90% RH.

5. A packaging material comprising a barrier film according to claim 1.

6. The packaging material according to claim 5, comprising a heat sealing layer, a barrier layer made of the barrier film, and an outer layer, in this order.

7. The packaging material according to claim 6, wherein the heat sealing layer contains a polyolefin resin.

8. The packaging material according to claim 6, wherein the outer layer contains a polyester resin.

9. The barrier film according to claim 1, wherein the organic solvent of the first liquid and the second liquid is at least one selected from the group consisting of methyl alcohol, ethyl alcohol, n-propyl alcohol, isopropyl alcohol, and n-butanol.

10. The barrier film according to claim 1, wherein the amount by mass of the first liquid (A) relative to the second liquid (B) in the mixture is 55/45 or more and 62/38 or less.

* * * * *